March 14, 1933. J. POBEREJSKY 1,901,330
FLUID CONDUCTIVE HOSE
Filed Oct. 11, 1930
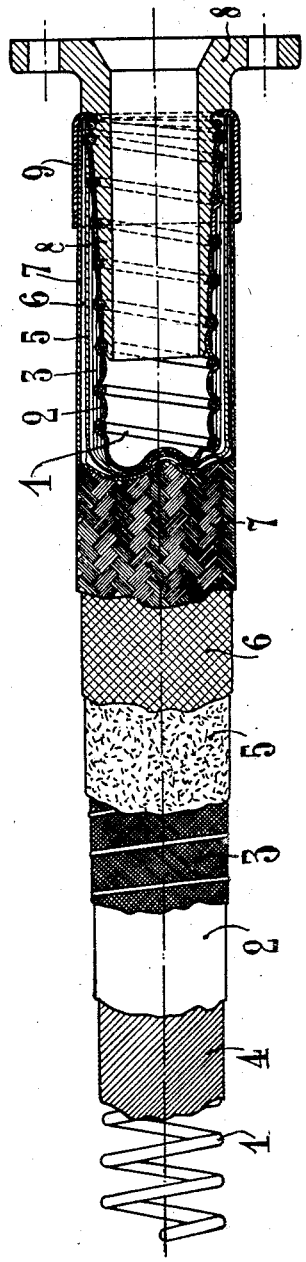
INVENTOR:
Jacques Poberejsky
BY
ATTORNEY Patented Mar. 14, 1933

1,901,330

UNITED STATES PATENT OFFICE

JACQUES POBEREJSKY, OF BOIS-COLOMBES, FRANCE, ASSIGNOR TO "SUPERFLEXIT," A CORPORATION OF FRANCE

FLUID-CONDUCTIVE HOSE

Application filed October 11, 1930, Serial No. 488,097, and in Germany March 20, 1930.

Such piping as was installed up to the present in motor cars and airplanes was of rigid character and consisted of metal tubing. Pipes of this character suffer from considerable drawbacks, the chief of which resides in that they will not resist the vibrations of the apparatus, which results in oil or gasoline leaks that may cause fire.

To do away with such inconvenience, I have devised a system which comprizes a flexible hose provided at both ends thereof with a nipple which can be fitted to the various appliances of the machine (airplane, motor car or the like) such as the carburetor, the tank, the pump, etc.

By reason of the great flexibility of the hose, it will effectively resist vibration. In addition, it is also resistant to the action of the fluids to be transferred and designed in such manner that the temperature of the said fluids will not impair its life.

As shown in the single figure of the appended drawing, the hose according to this invention is made up primarily of a coiled wire 1 of steel, iron, brass, aluminum or like metal. Wound directly upon the said coil is a cellulose film 2 the various layers of which are assembled by an adhesive material, whereby one single layer is made from the several laminations. The said film is not tightly applied upon the coil; instead, sufficient material must be provided between the turns to ensure that the material will yield and be expanded by a certain amount as the coil is extended.

The said cellulose film is secured in position by means of a cover 3 consisting of a cotton, linen, hemp or if necessary silk covering by which it is protected against external blows.

An additional layer 4 similar to layer 3 may also be interposed as a further safeguard between the coil 1 and the cellulose layer 2 in order to avoid direct contact of the same with the medium flowing through the hose.

This inner sheath may be of different character depending on the medium; thus, for instance, some kind of oil-cloth or stand- oil-treated fabric will preferably be chosen where oils are to be dealt with.

In order to obtain a perfect piping, a layer 5 of elastic and flexible material which is compressible and soft is thereafter arranged upon the layer 3.

Considering that safety against fire is of paramount importance in airplanes, the hose is covered with a fire-proof layer 6 of asbestos fabric or braid by which the piping will be made impervious to flames arising from any portion of the airplane or automobile equipped with such piping.

The external sheath 7 may consist either in a metal braid of copper, brass, steel or the like, or in a braid of cotton, hemp, linen, silk or the like, or in a covering of moleskin- or lincrusta-like fabric.

The flexible pipe thus produced is provided at both ends thereof with a metal nipple 8 of copper, brass, cast iron, steel, aluminum or the like having a conical groove cut therein to be engaged by the inner coil mentioned above, the nipple being suitably retained in position by an outer ring 9 of any suitable metal.

In this manner, the above described materials are squeezed between the nipple and the ring which cannot shift once it is set and will allow a perfect fitting of the hose upon any and all the appliances of the machine.

I claim

1. A hose for inflammable fluids especially adapted for conveying inflammable fluids to internal combustion engines subject to vibrations, comprising a helical wire coil, a cellulose layer thereon, said cellulose layer being formed of cellulose film wound about the coil and cemented together by means of adhesive material, a fabric covering surrounding the cellulose layer, a sheath of soft yielding material encasing the fabric, a layer of asbestos encasing the sheath of soft yielding material, and a protective metallic braid covering the asbestos.

2. A hose for inflammable fluids especially adapted for conveying inflammable fluids to internal combustion engines subject to vibrations, comprising a helical wire coil, a fabric covering on said wire coil, a cellulose layer on the fabric covering, said cellulose layer being formed of cellulose film wound about the coil and cemented together by means of adhesive material, a fabric covering surrounding the cellulose layer, a sheath of soft yielding material encasing the fabric, a layer of asbestos encasing the sheath of soft yielding material, and a protective metallic braid covering the asbestos.

In testimony whereof I affix my signature.

JACQUES POBEREJSKY.